United States Patent [19]

Blomberg

[11] 3,772,472

[45] Nov. 13, 1973

[54] SWITCHING DEVICE FOR TELEPHONE INSTRUMENTS, ADAPTED TO ALTERNATELY BE USED AS LOWSPEAKING AND LOUDSPEAKING TELEPHONES

[76] Inventor: Knut Hugo Blomberg, Lokattskagen 39, Bromma, Sweden

[22] Filed: Feb. 16, 1971

[21] Appl. No.: 115,388

[30] Foreign Application Priority Data

Feb. 18, 1970 Sweden .............................. 2086/70

[52] U.S. Cl. .......... 179/100 L, 179/1 HF, 179/81 B

[51] Int. Cl. .......................................... H04m 3/40

[58] Field of Search ........... 179/1 HF, 81 B, 100 R, 179/100 C, 100 D, 100 L, 178, 103, 1 C

[56] References Cited

UNITED STATES PATENTS

| | | | |
|---|---|---|---|
| 3,156,771 | 11/1964 | Vaughn | 179/1 C |
| 3,100,818 | 8/1963 | Carter | 179/1 C |
| 2,657,265 | 10/1953 | Branson et al. | 179/1 C |
| 3,426,160 | 2/1969 | Ring | 179/100 D |
| 3,075,048 | 1/1963 | Boeryd | 179/103 |
| 3,064,081 | 11/1962 | Axeltjeder | 179/103 |
| 3,041,411 | 6/1962 | Beatty | 179/1 HF |
| 2,895,007 | 7/1959 | Soderbaum | 179/1 HF |
| 2,801,287 | 7/1957 | Clemency | 179/1 HF |

*Primary Examiner*—Kathleen H. Claffy
*Assistant Examiner*—Randall P. Myers
*Attorney*—Burns, Doane, Swecker & Mathis

[57] ABSTRACT

A switching device for telephone instruments for enabling said instrument to be used alternately as a lowspeaking telephone and as a loudspeaking telephone compriisng a base support unit for said telephone instrument, said base support unit being provided with switching contacts, said switching contacts being adapted to switch over the telephone from lowspeaking to loudspeaking condition when the instrument is placed on to said support unit.

6 Claims, 5 Drawing Figures

SWITCHING DEVICE FOR TELEPHONE INSTRUMENTS, ADAPTED TO ALTERNATELY BE USED AS LOWSPEAKING AND LOUDSPEAKING TELEPHONES

BACKGROUND OF THE INVENTION

It is a frequently reoccurring need to use a loudspeaking telephone instead of the noramlly used lowspeaking telephone. The loudspeaking telephones available at the present time, which generally have to be installed instead of or in addition to the normal lowspeaking telephones, are generally rather expensive and not satisfactory for all purposes. The present invention solves the problem of converting a normal, lowspeaking telephone to a loudspeaking telephone by merely placing the whole telephone instrument on to a base support unit which comprises switching contacts and, under the action of the weight of the telephone, switches over the telephone from the lowspeaking to a loudspeaking condition. While the invention is applicable to all types of desk telephones, it is particularly suitable for desk telephone apparatus of the type which may be called an uprightstanding handset with a microphone and an earphone.

Because telephones of that type have their earphones as well as their microphones directed outwards to the room they are particularly well suited for said purpose. By means of this invention it will be possible for the user to use the ordinary uprightstanding telephone instrument alternately as a lowspeaking telephone functioning in a normal way and as a loudspeaking telephone when wanted. By the invention a simple, inexpensive and for the user very convenient equipment is obtained which has not been possible by devices hitherto available.

SUMMARY OF THE INVENTION

The invention relates to a switching device for telephone instruments adapted to alternately be used for lowspeaking and loudspeaking operation, wherein the loudspeaking equipment is put into use by means of the switching contacts belonging to the telephone instrument, when said instrument is in its signal receiving condition, and switching contacts located in a base support for the telephone instrument, which is adapted to be actuated when said telephone instrument is placed on to said base support.

In the following, the invention will be described with reference to the accompanying drawing and in connection with a telephone of the uprightstanding type although, as already mentioned, it may be used together with other types of desk telephones.

SHORT DESCRIPTION OF THE DRAWING

FIG. 5 is also modified in that respect that the normal earphone of the telephone instrument is used as a microphone in the loudspeaking condition.

Figures 1, 2, 3, 4:
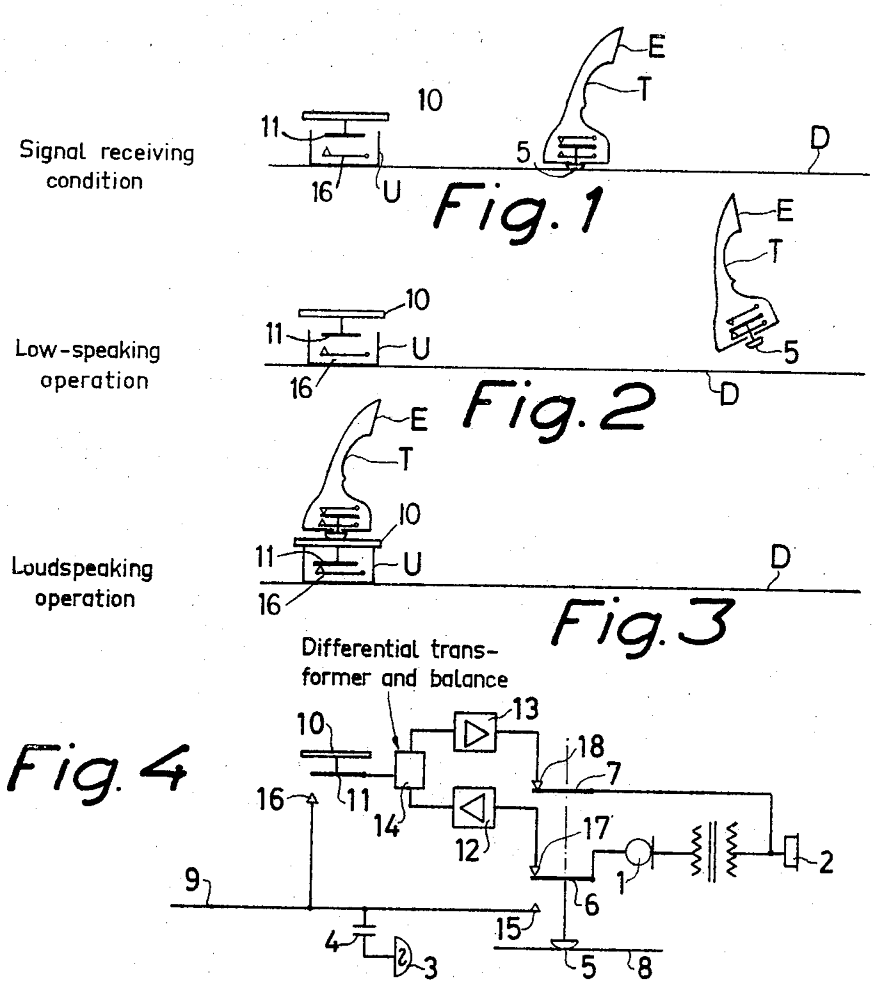
FIGS. 1, 2 and 3 illustrate the principle for the using of a telephone instrument equipped with a switching device according to the present invention.
FIG. 4 is a simplified circuit diagram illustrating how the telephone can be converted to a loudspeaking telephone by means of a switching device according to the invention, wherein the normal microphone and the normal earphone of the telephone are used also for the loudspeaking operation.

In FIGS. 1, 2 and 3 there is illustrated the three different functional conditions in which an uprightstanding telephone T is used. Normally the telephone instrument T is placed on a desk surface D or any other supporting surface. In the position shown in FIG. 1 the desk instrument T is in a signal receiving condition. When the user wants to make a call or when a call arrives he lifts the instrument as illustrated in FIG. 2 from the table surface D and dials the wanted telephone number by the finger dial (not shown) in the bottom of the telephone instrument T or he answers the incoming call by putting the earphone E belonging to the instrument to his ear. The telephone is now in its normal lowspeaking condition. If the user wants to carry out the rest of the conversation in a loudspeaking condition, he places the instrument on to a separate base support U, as shown in FIG. 3, said base support U being provided with a supporting surface 10 for the telephone instrument and comprising switching contacts 10 and 16 which will be operated by the weight of the instrument at the same time as a contact button 5 at the bottom surface of the instrument T is pressed inwards into said bottom surface. Then, the switching contacts switch over the instrument from signal receiving condition to loudspeaking condition. When the conversation is finished, the user puts his instrument back onto the table and thereby the instrument is again switched back to the signal receiving condition. If the user during the conversation will go over from a loudspeaking to a lowspeaking condition he has only to lift the telephone instrument from the base support and then continue the conversation while keeping the earphone E to his ear in a normal way.

When the telephone instrument is placed on the base support 4, it is in an elevated position, which is suitable for loudspeaking and at the same time, said elevated position is a clear indication for the user that the telephone instrument is connected for loudspeaking condition, so that the user when the conversation is finished will not forget to replace the telephone on to the table and thus transmit a clearing signal to the telephone exchange.

Figure 5:
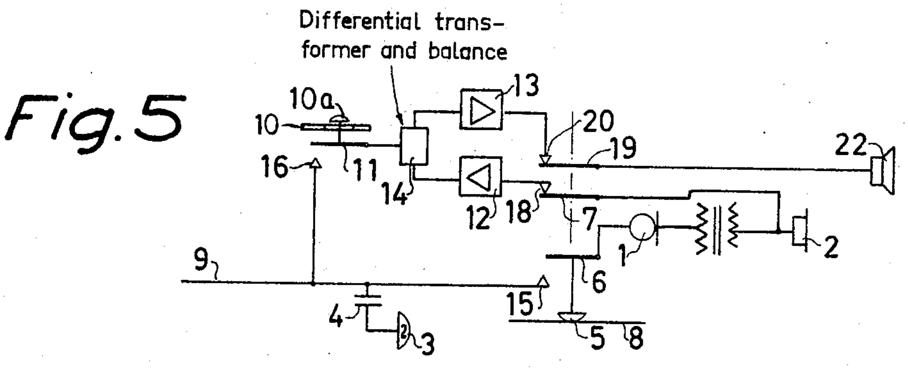
FIG. 5 is a circuit diagram substantially similar to that of FIG. 4 with the exception that according to FIG. 5 there is an external loudspeaker for serving in the loudspeaking condition of the telephone.

Before proceeding to describe FIGS. 4 and 5 in detail, it is pointed out that the parts 10, 11, and 16 shown in said figures belong to the base support U of FIGS. 1, 2, and 3 and the parts 5, 6, 7, 15, 17, and 18 of FIG. 4 or the parts 5, 6, 7, 15, 18, 19, and 20 of FIG. 5 belong to the telephone instrument T of FIGS. 1, 2, and 3, though the parts 6, 7, 15, 17, 18, 19 and 20 are not illustrated in detail in FIGS. 1 to 3.

FIG. 4 is a simplified circuit diagram illustrating the principle of an embodiment of a telephone instrument and a switching device according to the present invention. In this diagram all parts which are not necessary for describing the principle of the invention, such as the finger dial, have been deleted.

To the right in FIG. 4, a normal speech circuit of the telephone instrument T with a microphone 1 and an earphone 2 and a signalling device such as a bell 3 connected in series with the capacitor 4, is illustrated. The switching contact device belonging to the telephone instrument comprises the press button 5 located at the bottom surface of the instrument and adapted to operate the contact springs 6 and 7. The button 5 is shown in an inwardly depressed position brought about by pressure from the support surface 8. The telephone instrument is connected to the telephone line 9. The base support U comprises a supporting surface 10 which operates the contact spring 11. A two-way amplifier comprising one amplifier 12 for outgoing and one amplifier 13 for incoming speech is connected to a differential transformer with a balance network 14 in an ordinary way.

The Figure illustrates the circuit, when the telephone instrument is placed on a desk D, i.e. when the button 5 of the instrument is depressed but not the support surface 10 of the switching device. In this position only the signalling device 3 is connected to the telephone line 9. When the user lifts his telephone instrument for making a call or for receiving an incoming call the button 5 is displaced downwards and thereby the contact 6, 15 will be closed, whereby the normal speech circuit will be connected to the telephone line 9 and DC-current will be fed to the microphone 1 from the telephone exchange. If the instrument is placed on to the base support, the support surface 10 will be depressed at the same time as the button 5 of the telephone instrument will be pressed inwards. The amplifiers 12, 13, 14 is connected between the speech circuit and the telephone line over the contacts 11, 16 and 6, 17 and 7, 18. (The supply of current to the microphone is not illustrated). The telephone instrument is now switched over for loudspeaking operation whereby the earphone serves as a loudspeaker. When the instrument thereafter is lifted from the base support, the amplifier is disconnected and when the telephone is placed on to the desk D the speech circuit is disconnected. It will be apparent, that there is no risk for the user to getting the amplified speech right into his ear, because this would require both that the instrument is kept by the hand and that its contact button 5 and the switching contacts of the base support are simultaneously operated.

If the user, for example when he receives an incoming call, wants to use loudspeaking operation only for a short time, he may let the telephone instrument remain on the desk and by the hand press down the switching device of the base support, whereby loudspeaking operation is obtained while the telephone remains on the desk D. Then, the user may interrupt the conversation by releasing the switching device or continue the conversation as loudspeaking conversation by putting the instrument on to the base support, or as a lowspeaking conversation by lifting the telephone instrument to his ear.

In FIG. 5, a modified embodiment is illustrated, in which a separate loudspeaker 22 is used instead of the earphone belonging to the telephone. In that case, it is suitable to use the normal earphone 2 as a microphone. When the telephone instrument is placed on to the base support, the microphone 1 is disconnected from the telephone line 9 through the contact 6, 15 which is broken. Instead of that, the amplifier is connected in the circuit over the contacts 11, 16 actuated by a switching knob 10a which is movable up and down through a fixed supporting surface 10. This arrangement is to be considered as an alternative to the movable supporting surface of the base support U illustrated in FIGS. 1 to 3 and described in connection with FIG. 4. The amplifier for outgoing speech is connected to the microphone 2 over the contacts 7, 18 and the amplifier 13 for incoming speech is connected to the loudspeaker 22 over the contacts 19, 20. When the sound waves generated by the speaker reach the earphone 2, speech currents are generated by said speaker and in an amplified condition transmitted through the line 9.

The switching operations described in the foregoing are merely to be considered as some embodiments for exemplifying the invention. It is evident to anyone skilled in the art that different embodiments, for example for the amplification, can be used according to the requirements that may be made regarding the volume and the quality of the sound reproduced when the telephone is used for loudspeaking operation. In certain cases, it may be sufficient to use only the uprightstanding handset and to amplify only the outgoing or the incoming speech. It is also possible to use a separate microphone instead of a separate loudspeaker or in some cases both microphone and loudspeaker as a separate unit or as two separate units. The amplifier may also be designed for voice operation instead of being connected to a simple balance circuit of the like. It should be observed, that the loudspeaking operation never occurs during impulsing by the finger dial which makes it possible to use great amplification of the received speech without any risk for accoustical feed-back.

Because the amplifier equipments which are used nowadays for the purposes described in the foregoing as a rule are transistorized amplifiers to which current is supplied from the line, said amplifiers are of small dimension and require small space. Therefore, it is preferable to locate said amplifiers in the housing of the base support. Also the separate loudspeaker may be mounted there. In that case, the movable supporting surface may be designed as a sound absorbing screen between the microphone and the loudspeaker for reducing the risk of accoustical feed-back. If a separate microphone is used this may alternatively be mounted in the base support.

If a separate loudspeaker is used, it may be suitable to arrange the signalling of the telephone set as an audible tone reproduced by the loudspeaker instead of signalling by supplying ringing current to the bell 3. In that case, no bell is required and a more pleasant calling signal is obtained in the loudspeaker mounted in the base support. In case the signal device is a ringing bell, a buzzer or the like, it can, of course, be mounted in the base support, whereby its location in the uprightstanding telephone instrument or in a wall box belonging to said instrument is avoided. The base support described has a whole movable support surface for the uprightstanding instrument which actuates the switching contacts when it is pressed down.

The telephone instruments described are supposed to be connected to a telephone station or to a telephone switchboard. The invention may, however, be equally well applicable to intercoms, for example intercoms of the quick telephone type, without departing from the principle of the invention.

What I claim is:

1. A switching device for a telephone to provide alternate use of a telephone instrument as lowspeaking and loudspeaking, said telephone instrument including a first set of switching contacts connected to transfer the telephone from a signal receiving condition to lowspeaking operation, a base support means separate from the telephone instrument, said base support including a second set of switching contacts which are arranged to be actuated when said telephone instrument is placed on said base support and, together with said first set of switching contacts in the signal receiving condition, to put the telephone in loudspeaking operation.

2. Switching device according to claim 1 for upright-standing telephone instruments with a switch for actuating said first set of contacts located in the bottom part of the telephone instrument, by which the instrument is connected in a signal receiving condition, when it is standing on a desk surface or the like and is connected in a lowspeaking operation when lifted from said surface, and wherein said loudspeaking equipment is connected to become operative by the actuation of both the switch located in said bottom part and the second set of switching contacts located in the base support means when the telephone instrument is placed onto the base support.

3. Switching device according to claim 1, further including a movable surface on said base support means which is actuated by the weight of the telephone instrument for operating the switching contacts of the base support means.

4. Switching device according to claim 1 further including a switching knob located in a stationary support surface for the telephone instrument for operating the switch contacts of the base support means.

5. Switching device according to claim 1, wherein said loudspeaking equipment entirely or partly is mounted in said base support means.

6. In a switching device for a telephone, for converting said telephone from lowspeaking to loudspeaking condition and vice versa when desired:

a telephone instrument lowspeaking equipment including a microphone and a receiver;

a first set of switching contacts belonging to said telephone instrument;

a press button located in a bottom surface of said instrument, said press button being adapted to actuate said first set of switching contacts when depressed because of said instrument being placed on a support surface to place the instrument in a signal receiving condition and when not depressed to place the instrument in a lowspeaking condition;

a base support unit for said telephone instrument but separated therefrom, said base support unit comprising:

a housing;

a supporting surface for said telephone instrument; and a second set of switching contacts, the second set of switching contacts as well as said first set of switching contacts being adapted to be actuated by the weight of said telephone instrument when placed on said support surface of the base support; and electrical interconnection means connecting together said first set of switching contacts, said second set of switching contacts, an incoming telephone line and the receiver and transmitter of said telephone, said interconnecting means further comprising loudspeaking equipment connected to be operative when said first and said second sets of switching contacts are simultaneously actuated in response to the telephone instrument being placed on said support surface of said separate support unit.

* * * * *